L. B. HUNT.
Car Wheel.

No. 111,211.  Patented Jan. 24, 1871

UNITED STATES PATENT OFFICE.

LEWIS B. HUNT, OF NEW YORK, N. Y.

IMPROVEMENT IN RAILWAY-CAR WHEELS.

Specification forming part of Letters Patent No. 111,211, dated January 24, 1871.

*To all whom it may concern:*

Be it known that I, LEWIS B. HUNT, of the city, county, and State of New York, have invented a new and useful Improvement in Railroad-Car Wheels; and I do hereby declare the following to be a full, clear, and exact description thereof, which will enable those skilled in the art to make and use the same, reference being had to the accompanying drawings, forming part of this specification, in which drawings—

Figure 1:
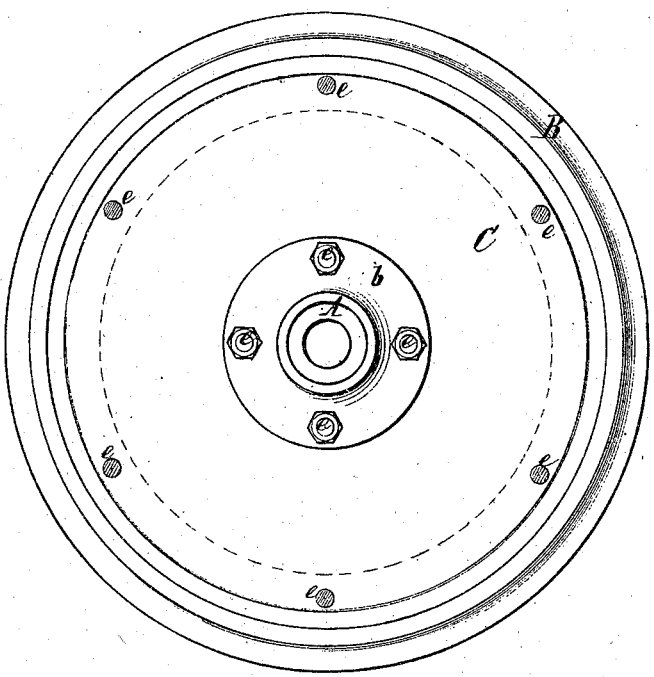
Figure 2:
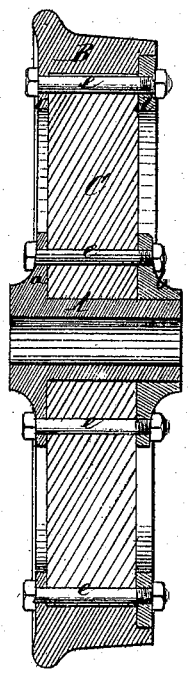

Figure 1 represents a face view of my wheel. Fig. 2 is a transverse central section of the same.

Similar letters indicate corresponding parts.

This invention relates to a car-wheel made partially or wholly of vulcanized wood. It consists in the arrangement of a disk of vulcanized wood between the hub and the rim of a car-wheel, both the rim and the hub being provided with flanges, to which the disk of vulcanized wood is secured by means of screw-bolts in such a manner that a wheel is obtained which is superior in durability, lightness, and elasticity.

In the drawings, the letter A designates the hub of a car-wheel, which is provided at one end with a rigid flange, *a*, while its other end fits in a loose flange, *b*, the hub and its flanges being made of cast-iron or any other suitable material.

The letter B designates the rim or tire, which is cast or otherwise produced of steel or iron, and which is entirely detached from and independent of the hub A. Said rim or tire is provided with a rigid flange, *c*, and with a loose flange, *d*, that drops into a groove of the rim or tire, as shown in Fig. 2 of the drawings. The annular space between the hub and the rim or tire is occupied by a disk, C, of vulcanized wood, or a compound prepared according to the patent of S. P. Wheeler, April 5, 1870, No. 101,552, or the patent of W. B. Gleason, November 26, 1867, No. 71,294; and this disk of wood is secured between the flanges *c d* of the rim or tire B by means of screw-bolts *e*, and between the flanges *a b* of the hub by means of screw-bolts *e'*. The disk C', being made of a compound of wood, india-rubber, and other substances, is very tough, and at the same time it retains a certain elasticity; and since it forms the sole connection between the rim or tire B and the hub A, and consequently has to sustain all the shocks and blows to which the rim of a car-wheel is exposed while in operation, said disk acts as a sort of cushion, which softens the blows and shocks, and thereby a considerable saving in the rolling-stock and in rails is effected.

What I claim as new, and desire to secure by Letters Patent, is—

1. The cushion of what I term "vulcancanized" wood, interposed between the rim or tire and the hub of a car-wheel, and forming the sole connection between them, substantially in the manner herein shown and described.

2. Car-wheels made in whole or in part of vulcanized wood.

LEWIS B. HUNT.

Witnesses:
   W. HAUFF,
   E. F. KASTENHUBER.